United States Patent [19]
Nguyen et al.

[11] Patent Number: 5,321,698
[45] Date of Patent: Jun. 14, 1994

[54] METHOD AND APPARATUS FOR PROVIDING RETRY COVERAGE IN MULTI-PROCESS COMPUTER ENVIRONMENT

[75] Inventors: Quang H. Nguyen, San Jose; Glenn Grant, Saratoga; Duncan Penman; Allan Zymslowski, both of Sunnyvale; Armand Minnie, Salinas, all of Calif.

[73] Assignee: Amdahl Corporation, Sunnyvale, Calif.

[21] Appl. No.: 815,320

[22] Filed: Dec. 27, 1991

[51] Int. Cl.$^5$ .............................................. G06F 11/00
[52] U.S. Cl. .......................................... 371/12; 371/7
[58] Field of Search ................. 371/12, 11, 15.1, 16.1, 371/32, 33, 7; 395/425, 325

[56] References Cited
U.S. PATENT DOCUMENTS

| | | | |
|---|---|---|---|
| 3,818,199 | 6/1974 | Grossmann et al. | 235/153 |
| 4,438,494 | 3/1984 | Budde et al. | 371/11 |
| 4,503,535 | 3/1985 | Budde et al. | 371/11 |
| 4,783,730 | 11/1988 | Fischer | 364/200 |
| 4,819,232 | 4/1989 | Krings | 371/12 |
| 4,852,092 | 7/1990 | Makita | 371/12 |
| 4,982,402 | 1/1991 | Beauon et al. | 371/12 |
| 4,991,174 | 2/1991 | Mori et al. | 371/15.1 |
| 5,153,884 | 10/1992 | Lucak et al. | 371/32 |
| 5,212,631 | 5/1993 | Schmidt et al. | 364/136 |

Primary Examiner—Robert W. Beausoliel, Jr.
Assistant Examiner—Joseph E. Palys
Attorney, Agent, or Firm—Fliesler, Dubb, Meyer & Lovejoy

[57] ABSTRACT

The invention provides a method and apparatus for localizing error recovery activities to specific ones of logically parallel processes ongoing within a computer and to the initiators of error-infected ones of such processes.

15 Claims, 4 Drawing Sheets

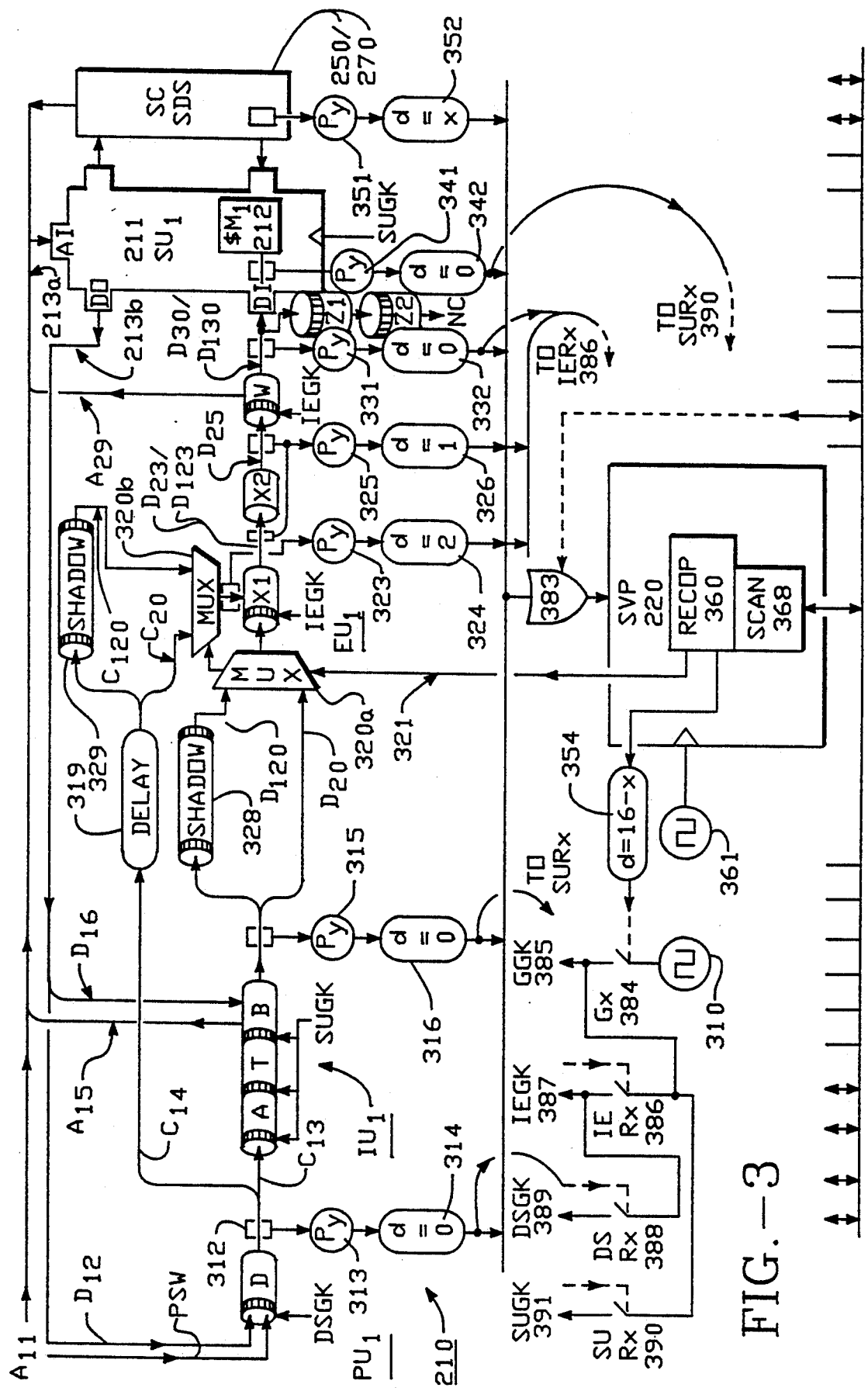
FIG.—3

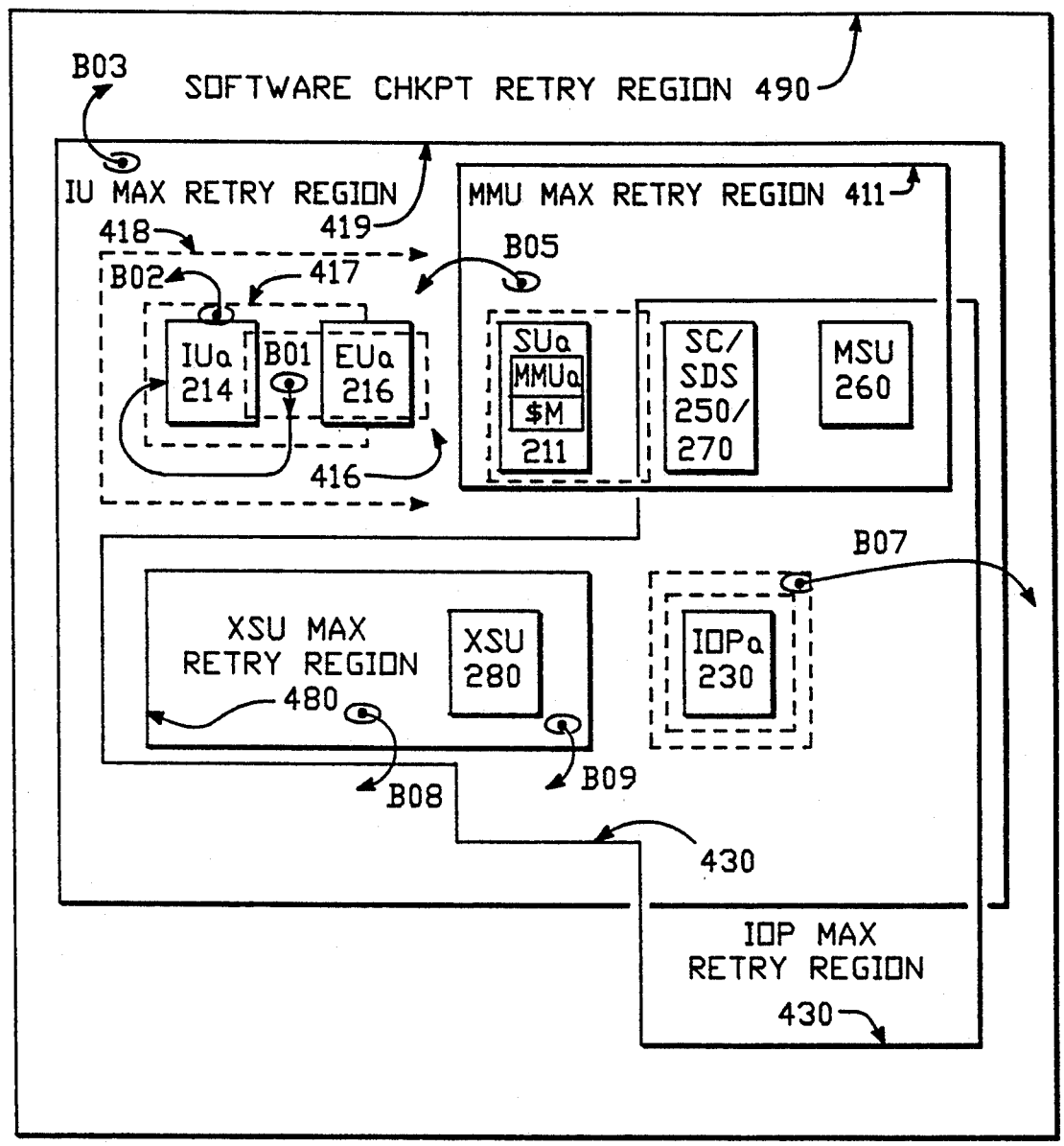
FIG.—4

METHOD AND APPARATUS FOR PROVIDING RETRY COVERAGE IN MULTI-PROCESS COMPUTER ENVIRONMENT

BACKGROUND

1. Field of the Invention

The invention relates generally to computing systems. The invention relates more specifically to a method for recovering transparently and automatically from different types of error conditions which may develop inside a digital computer.

2a. Cross Reference to Related Applications

The following copending U.S. patent application(s) is/are assigned to the assignee of the present application, is/are related to the present application and its/their disclosures is/are incorporated herein by reference:

(A) Ser. No. 07/813,891 filed Dec. 23, 1991, by Christopher Y. Satterlee et al, and entitled, IMPROVED METHOD AND APPARATUS FOR LOCATING SOURCE OF ERROR IN HIGH-SPEED SYNCHRONOUS SYSTEMS;

(B) Ser. No. 07/670,289 entitled "SCANNABLE SYSTEM WITH ADDRESSABLE SCAN RESET GROUPS", by Robert Edwards et al, which was filed Mar. 15, 1991.

(C) Ser. No. 07/814,389, entitled "METHOD AND APPARATUS FOR MAINTAINING DETERMINISTIC BEHAVIOR IN A FIRST SYNCHRONOUS SYSTEM WHICH RESPONDS TO INPUTS FROM NONSYNCHRONOUS SECOND SYSTEM, James Millar, et al., filed Dec. 26, 1991.

2b. Cross Reference to Related Patents

The following U.S. patent(s) is/are assigned to the assignee of the present application, is/are related to the present application and its/their disclosures is/are incorporated herein by reference:

(A) U.S. Pat. No. 3,840,861, DATA PROCESSING SYSTEM HAVING AN INSTRUCTION PIPELINE FOR CONCURRENTLY PROCESSING A PLURALITY OF INSTRUCTIONS, issued to Amdahl et al, Oct. 8, 1974;

(B) PROGRAM EVENT RECORDER AND DATA PROCESSING SYSTEM, U.S. Pat. No. 3,931,611, issued to Grant et al, Jan. 6, 1976;

(C) U.S. Pat. No. 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981;

(D) U.S. Pat. No. 4,661,953, ERROR TRACKING APPARATUS IN A DATA PROCESSING SYSTEM, issued to Venkatesh et al, Apr. 28, 1987;

(E) U.S. Pat. No. 4,679,195, ERROR TRACKING APPARATUS IN A DATA PROCESSING SYSTEM, issued to Dewey Jul. 7 1987;

(F) U.S. Pat. No. 4,685,058, TWO-STAGE PIPELINED EXECUTION UNIT AND CONTROL STORES, issued to Lee et al, Aug. 4, 1987;

(G) U.S. Pat. No. 4,752,907, INTEGRATED CIRCUIT SCANNING APPARATUS HAVING SCANNING DATA LINES FOR CONNECTING SELECTED DATA LOCATIONS TO AN I/O TERMINAL, issued to Si, et al. Jun. 21, 1988;

(H) U.S. Pat. No. 4,802,088, METHOD AND APPARATUS FOR PERFORMING A PSEUDO BRANCH IN A MICROWORD CONTROLLED COMPUTER SYSTEM, issued to Rawlinson et al, Jan. 31, 1989;

(I) U.S. Pat. No. 4,819,166, MULTI-MODE SCAN APPARATUS, issued to Si et al Apr. 4, 1989; and (J) U.S. Pat. No. 4,855,947, MICROPROGRAMMABLE PIPELINE INTERLOCKS BASED ON THE VALIDITY OF PIPELINE STATES, issued to Zmyslowski et al, Aug. 8, 1989.

3. Description of the Related Art

The terms "automatic error recovery" and "fault tolerant" are used here to refer to the ability of a certain class of computers to automatically correct internal error conditions and to continue operations at near-top-speed. When such computers are employed, and correctable error conditions occur, end users receive correct computational results without ever being aware that the error conditions had occurred and that the computer self-corrected these. (It should be noted that not all errors are self-correctable by the machine.)

One previous form of automatic error recovery is referred to as "check-point recovery". This type of recovery is found, by way of example, in the IBM 3080 family of mainframe computers.

In checkpoint recovery, operations within the computer are periodically halted at prescheduled "checkpoints." A back-up copy of the machine state is made at each checkpoint to safeguard against the possibility that an error condition will develop before the next checkpoint.

When the computer is first turned on, system clocks are turned off, a master reset is applied and all parts of the computer are tested to make sure they are error free. A snapshot of the entire machine state is taken and saved in memory. This snapshot is defined as the last-known error-free machine state.

System clocks are then turned on for a brief period of time (e.g., 1,000,000 clock cycles), allowing a burst of operations to take place within the computer. When a first post-reset checkpoint is reached, clocks are again halted and a search is conducted for raised error flags. If no errors are found to have occurred Within the brief run, a snapshot of the new machine state is taken and preserved as the last-known error-free state. Operations are allowed to resume until a second post-reset checkpoint is reached. The process repeats as long as there are no errors.

If any errors are found to have occurred within the a last run, the computer is reloaded with its last-known error-free state and the run is tried again. If the error does not reappear in the retry, as is common with many types of "soft" errors (e.g., noise induced or alpha particle induced errors), users of the computer are left unaware that an error ever occurred. Such recovery is referred to as end-user transparent.

If the error does not go away after a predetermined number of retries, a "machine-check" flag is raised and operations are halted to await high-level intervention (correction by the system operator). This condition is undesirable because the error condition is made very apparent to end-users. Their terminals become nonresponsive and they quickly realize that the computer has been brought "down" by some sort of defect. If shutdowns occur too often, end-users begin to lose faith in the reliability of the machine.

An important feature of checkpoint recovery is that it automatically corrects all sorts of soft errors. Special software does not have to be written for figuring out where in the machine each error occurred or what instruction was being executed when the error arose. Checkpoint recovery inherently provides coverage for all instructions and all errors that are correctable by way of retry. This is an advantageous property of checkpoint recovery.

Unfortunately, checkpoint recovery also comes with a major disadvantage. It inherently slows the computational speed of the computer. This is so because the computer halts at every checkpoint and waits for a snapshot of its machine state to be taken. Overall system performance suffers.

A second form of automatic error recovery has been developed to overcome the performance shortfalls of checkpoint recovery. The second type of recovery is commonly referred to as "instruction retry". It may be found, by way of example, in mainframe computers belonging to the IBM 3090 family.

Instruction retry focuses on the stream of instructions that were most-recently executed by the computer's central processor unit (CPU). The start of each instruction execution is used as a marker for identifying the point in time where the machine first entered an error-infected state.

As instructions stream through the CPU, a record of the most-recently executed instructions is maintained. When an error is detected, it is associated with a particular one of the instructions held in the record of most recently-executed instructions. The state of the computer is stepped back to where it was just before the particular instruction was fetched and executed. The stream of subsequent machine operations is then retried.

A major drawback to the instruction retry approach is that not every error can be readily associated with a particular instruction. If, for example, an error occurs in the circuitry that is responsible for maintaining cache to mainstore coherency, and the error does not arise from an action initiated by a recent CPU instruction, there is no CPU instruction which can be specifically associated with the timing of the cache-coherency error. Also, modern machines have pipelined architectures wherein the execution flows of multiple instructions are moving down the pipeline at the same time. The instruction retry approach has to determine which of the concurrently executing instructions is the one that is to be retried. Stepping back and retrying an arbitrarily selected CPU instruction will not correct a cache coherency error. It will merely slow down the CPU. The system is eventually forced to take a non-transparent machine check for each cache-to-mainstore related error after it is realized that numerous retries of the last CPU instruction do not clear the cache error. Similarly, a non-transparent machine check is eventually taken for all other errors that are not logically associable with a specific instruction. The end result is that users lose access to the machine even for errors which in theory should be self-correctable by the machine.

There is yet another drawback to the instruction retry approach. Specialized hardware is often necessary for resetting or stepping the machine state back out of each peculiar type of partially-executed or fully-executed instruction to the state it was in at the very start of that instruction. Due to cost and other considerations, machine designers tend to take short cuts and build step-back/retry capabilities into the machine only for the more commonly used instructions. Retry coverage is thus provided for only a small fraction (e.g. 15%) of all instructions which may be executed on the machine. Non-transparent machine checks have to be disadvantageously taken for all errors not associable with this small fraction of instructions.

Moreover, there is a growing trend in the industry to improve computational speed through the use of parallelism. Parallel processors may be operating on data stored within a shared memory. If an error condition is detected within the shared memory, the conventional instruction-retry approach is left with the dilemma of not knowing which instruction of which parallel processor is to be retried.

SUMMARY OF THE INVENTION

The invention overcomes the above-mentioned problems by providing a retry means and methodology which gives more complete error coverage and which does so even in a multi-processor computer environment.

A first aspect of the invention has to do with realizing that logically-independent local processes take place in parallel within modern computing machines. Each process can be associated with a unique process-initiator and a unique most-recent initial state.

For example, when a multi-processor architecture is used, it is recognized that an instruction fetch in the instruction flow of a first processor unit (PU1) is not necessarily the immediate initiator of a process taking place in a second processor unit (PU2). When viewed locally, the process executing in the second unit (PU2) can be typically considered independent of the process executing in the first unit (PU1). If an error condition develops in the second processor unit, it is the second unit (PU2) that needs to be stepped back to a pre-error state, not the first processor unit. Operations in the first processor unit (PU1) may continue unimpeded (providing it does not have to immediately conduct a transaction with the second processor unit). When retry localization of this nature is employed, the operation-slowing impact of error recovery is advantageously confined to the region of the most immediate process initiator (e.g., to instruction fetch mechanism of the second processor unit, PU2) rather than being spread to a global level where it equally slows the operations of all other processor units (e.g., PU1, PU3, PU4, etc.).

By way of further example, it is recognized that cache-to-mainstore coherency is maintained by data read/writes to cache memory which are logically separable from the instruction fetches out of cache memory and execution writebacks to cache memory, as required for executing an instruction in a particular processor unit. Both types of read/write operations affect the cache memory yet they are logically distinguishable. The processor unit (PU) is deemed to be the initiator of instruction-fetch/execute-writeback operations taking place in its private cache area while an independent memory management unit (MMU) is deemed to be the initiator of the cache-coherency maintaining operations.

Just as there is a process initiator for each logically independent process, there is also a most-immediate process initiating state that can be associated with each logically independent process. An instruction-execute initiating state within a specific processor unit (PU) for example, is responsible for initiating each instruction-fetch/execute-writeback operation for the PU's private cache area. An independent, process-initiating state within the MMU is responsible for initiating each coherency-maintaining read/write operation affecting the same cache.

Each item of data flowing into or out of cache memory is associated with a specific process initiator and a most recent initial state of that initiator. If a parity error is detected in a data signal passing through the data input (DI) port or data output (DO) port of the cache memory, and it is determined that the error-infected data signal belongs to the cache-to-mainstore coherency-maintaining process, it is the MMU rather than the PU which is instructed to step back to its most recent process initiating state and to retry its last operation.

If, on the other hand, the error-infected data belongs to an instruction-fetch or execute-writeback process of a specific PU, it is the PU rather than the MMU which is instructed to step back and retry its last operation.

Consider now a further example which expands on the above concept. When direct memory access (DMA) transfers take place, such as those commonly occurring between magnetic disk and mainstore RAM (random access memory), the DMA data flow is deemed logically independent of the data flow associated with the cache-to-mainstore coherency-maintaining operations or the PU-to-cache read/write operations. Each item of data moving in or out of a mainstore data port (DI or DO) can belong either to a DMA transfer or to a cache coherency transfer. (Data items destined for a specific PU move into cache first.)

If a parity error is detected at a mainstore data input/output (I/O) port, the error-infected data can be associated either with a DMA "initiator" (e.g. the circuit which controls the start and stop of a DMA transfer) or with a cache coherency process "initiator" (the MMU). If error-infected data at a mainstore I/O port is associated with the DMA transfer, a retry command is sent to the DMA initiator rather than to the MMU. Note that, in this example, PU's (processor units) are considered to be outside the immediate retry region of a mainstore error.

Speaking in more general terms, each signal flowing through the computer (this includes each data signal, each address signal and each control signal) can be associated with one of a plurality of logically independent processes taking place within the computer. Each process can be paired with a process initiator and a most recent process-initiating state of that initiator. When a signal is found to be infected by an error condition (e.g., a parity error), the process initiator associated with the error-infected signal i asked to step back to a recent process initiating state and to retry the process. Error-recovery is thus localized to a process initiator and initial state most immediately connected with the error.

There is a second aspect to the invention which extends the above concept from the macroscopic world of PU's, MMU's, etc., to the internal structure of each such unit. It is recognized that an instruction fetch by a processor unit (PU) or a cache-read by a MMU is not necessarily the closest-placed initiator state which led to the generation of an error-infected signal within a processor unit. There are processes within processes.

A processor unit (PU), for example, can be subdivided into an instruction unit portion (IU) and an execution unit portion (EU). From a data-flow point of view, the EU can be considered to be positioned downstream of the IU. In some instances, a particular state within the execution unit (EU) rather than the instruction unit (IU) of a processor unit might be considered the closest-placed process-initiating point from which a retry should be conducted.

Assume, for example, that at a given point in time the instruction unit (IU) has correctly fetched an instruction and its corresponding operands out of cache, but the execution unit (EU) has not yet written execution results back into cache. Assume further that an error is detected in a signal flowing through the execution unit (EU) at the given point in time.

According to the principles of the invention, the closest-placed process initiating state is the state where the instruction unit (IU) presented appropriate operand-fetching address signals to the cache and the execution unit (EU) was about to receive and perform a specified operation (e.g., add, subtract) on the addressed operands.

Upon detection of the error state, the execution unit (EU) is blocked from writing its error-infected results into cache and the instruction unit (IU) is frozen or stepped-back to the state where it presented error-free operand-fetching address signals to cache; those address signals being the ones which produced the operand signals that were wrongly processed downstream by the execution unit (EU). The EU retries its operations from that point forward, and if no error is detected during the retry, error-free results are produced for storage in cache. Of importance, the IU does not have to repeat its error-free operations. Retry efforts are localized to stepping back only the EU and time for recovery is therefore minimized.

It is seen from the above that the retry-localizing concepts of the invention can be applied both macroscopically, for example, at the cache-to-mainstore level, and also microscopically, for example, at the IU-to-EU level. It is also seen that, where possible, retry efforts are directed to that part of an upstream or downstream data flow which is most-immediately affected by an error condition.

When these principles are applied at the microscopic level, to the internal structure of each processor unit (PU), an additional benefit is realized. Retry coverage is provided at reduced cost for a broader class of instructions within the instruction set of the computer than would have been provided by the instruction-retry approach of the prior art.

The application of the above principles at the macroscopic level leads to the beneficial result that retry coverage is provided for processes such as cache-coherency maintenance which are not directly related to any particular execution by a processor unit (PU) of a program instruction.

A computer in accordance with the invention is constructed with a plurality of error detectors distributed among signal-carrying components of the computer for detecting error conditions in signals flowing through the components. A plurality of process initiating means are identified within the computer. Each process initiator is designated as being most immediately responsible for initiating one or a plurality of specific processes within the computer (e.g., instruction fetch and execute, cache-to-mainstore writeback, etc.). Process associating means are provided for associating each address signal, data signal, control signal or other signal with one or more specific processes. Initiator associating means are provided for associating each specific process with a process initiator and a most-immediately retriable state of the initiator. Retry control means are provided for transmitting retry commands to one or more of the process initiators upon the detection of an error condition in one of their associated signals.

When an error condition is detected in a particular signal, a process retry command is sent to the initiator of the most localized process associated with the error-infected signal. The retry command resets or steps that initiator backwards to the most immediate state from which the process could be retried.

If the retry does not correct the error condition, then the next broader process associated with the error-initiated signal is considered. The initiator of that broader process is stepped back or reset to the most immediate initiating state of the broader process and the broader process is retried. If that retry does not successfully remove the error condition, then a broader process is retried. This continues until either there are no broader processes or it is determined that a retry at a higher level will not help. At that point, a non-transparent machine check is taken.

BRIEF DESCRIPTION OF THE DRAWINGS

The below detailed description makes reference to the accompanying drawings, in which:

FIG. 3 is a schematic diagram illustrating in more detail how error infection is contained and retry activities are focused to a localized region of a particular unit.

FIG. 4 is a flow chart showing how recovery activities bubble out from one retry region to another when retry in an inner region is not successful.

DETAILED DESCRIPTION

The following description illustrates the invention by way of a sequence of embodiments in accordance with the invention, starting with a simple uni-processor embodiment and progressing to a more complex multiprocessor computer having a pipelined instruction flow.

Figure 1:
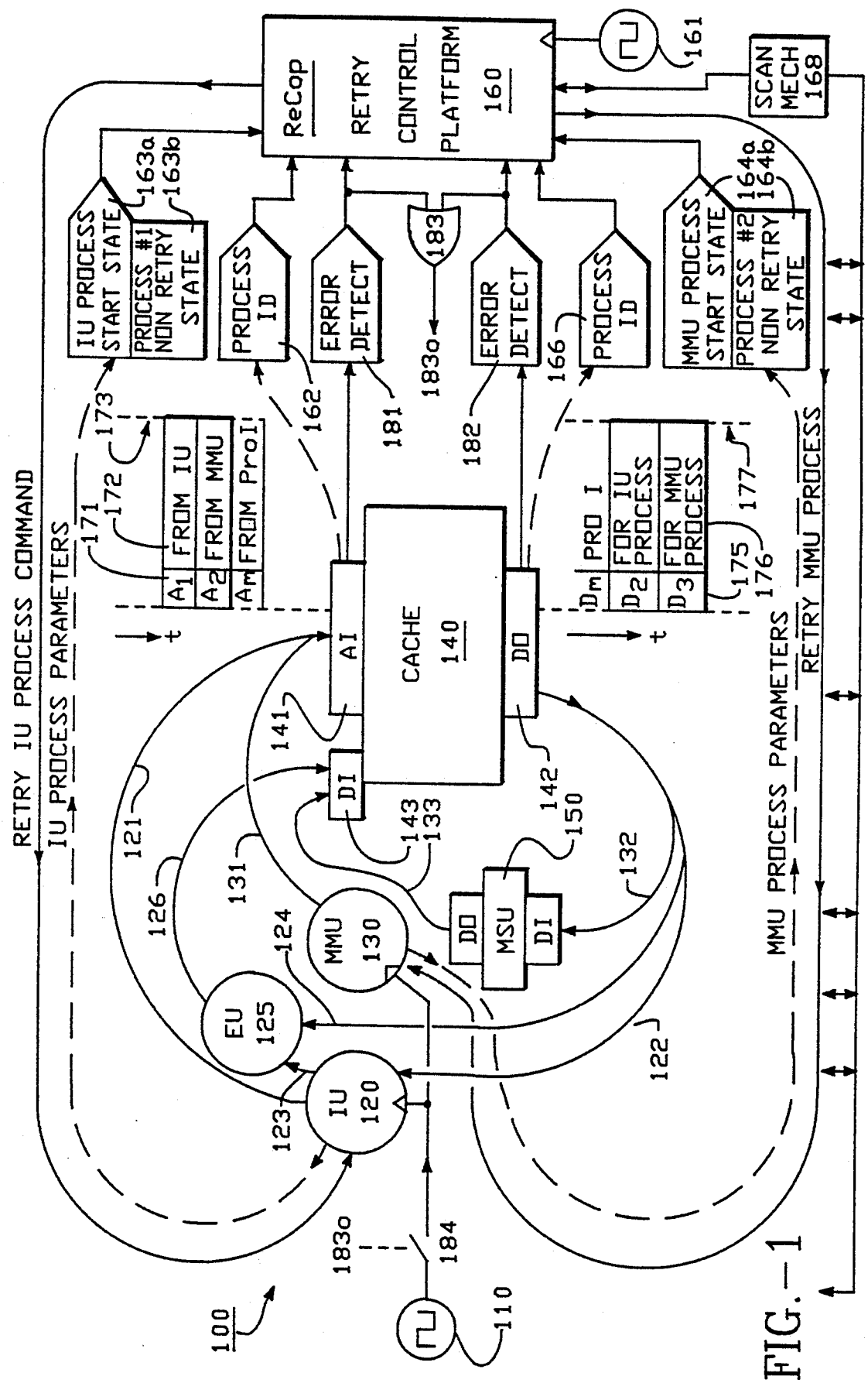
FIG. 1 is a block diagram of a first, uniprocessor computer which incorporates a retry platform in accordance with the invention.

FIG. 1 shows a first computer system 100 in accordance with the invention. Included in system 100 are a system clock generator 110, an instruction unit (IU) 120, an execution unit (EU) 125, a memory management unit (MMU) 130, a cache memory unit (SMU) 140, a main storage unit (MSU) 150 and a recovery control platform (ReCoP) 160. (ReCoP 160 is clocked by independent clock generator 161). It is to be understood at all components of system 100 operate in synchronism with one of clock generators 110, 161 unless otherwise stated. The IU 120, EU 125 and MMU 130 are sequential state units which step from one state to a next in synchronism with clock generator 110. IU 120 in combination with EU 125 defines a processor unit (PU).

Cache 140 is constructed with high-speed SRAM (static random access memory) devices of relatively small storage capacity. The main storage unit (MSU) 150, on the other hand, is constructed with relatively low-speed RAM devices (static or dynamic) and has relatively large storage capacity. Cache 140 stores a periodically updated copy of a data block within MSU 150. Preferentially, the copied data block in cache 140 is one which contains data soon to be required by the instruction unit (IU) 120. Memory management unit (MMU) 130 is responsible for maintaining coherency between the data copy in cache 140 and the corresponding data in MSU 150

When a computer program executes, the IU 120 sends instruction fetch requests over address path 121 to an address input (AI) port 141 of cache 140. Corresponding instruction codes flow out of a data output (DO) port 142 of the cache 140 and move along instruction path 122 back to the IU 120. The instruction unit 120 decodes the fetched codes (122) and sends corresponding execution instructions along path 123 to the execution unit (EU) 125. Simultaneously, the IU 120 sends operand-fetching address signals along path 121 into cache 140, and cache 140 returns operand signals along path 124 to the execution unit 125. For most instructions, the execution unit (EU) 125 will send result data along path 126 to a data input (DI) port 143 of cache 140, where the result data is then stored.

As data within cache 140 changes in response to result data written from EU 125 into cache 140, it becomes necessary to write back a copy of the cache data to the main storage unit (MSU) 150. Memory management unit (MMU) 130 decides when this should occur. It sends address signals over address path 131 to the AI port 141 of cache 140. Corresponding data words flow out from the cache DO port 142 and move along data path 132 for storage in MSU 150.

The address signals received by the cache AI port 141 are multiplexed over time as indicated at 171. The symbol "$A_m$" represents a general address signal entering the AI port at machine cycle, m. The process initiator (ProI) which caused the "$A_m$" signal to be delivered to AI port 141 is identified in column 172. Dash lines 173 at the sides of columns 171 and 172 indicate that the illustrated address signals (Am's) are part of a long continuous stream which flows down into the AI port 141. The ProI indicators are part of a corresponding stream which is tracked within the recovery control platform (ReCoP) 160.

In the illustration, IU 120 is the initiator associated with first address signal $A_1$. MMU 130 is the initiator associated with second address signal $A_2$. It is to be understood that the $A_m$ signals entering AI port 141 are not limited to those for which the process initiator (ProI) is either the IU 120 or the MMU 130. Address signals produced from the actions of other initiators are also contemplated.

The corresponding stream of data signals ($D_m$) which flow out of the cache DO port 142 is indicated in column 175, m being a machine cycle identifier. $D_2$ is the output data requested by address signal $A_1$. $D_3$ is the output data requested by address signal $A_2$. The device (ProI) which is deemed to have initiated each data fetch is indicated correspondingly in column 176. Dashed lines 177 indicate that the illustrated data output stream is part of a much longer data stream flowing out from the cache DO port 142. It is to be understood that the DO signal stream 175 can include data signals whose production was requested by initiators other than IU 120 or MMU 130.

A first error detector 181 is shown coupled to cache AI port 141 for detecting error conditions (e.g., parity errors) in any of the address signals $A_m$ passing through that port. A second error detector 182 is shown coupled to cache DO port 142 for detecting error conditions in any of the data signals $D_m$ passing through that port. Naturally, the $A_m$ and $D_m$ signals are structured to contain parity or ECC (error correction code) fields which allow detectors 181 and 182 to function as stated.

The outputs of error detectors 181 and 182 feed an error history tree (represented as OR gate) 183. Error history tree 183 has an output 183o which drives clock-shutoff mechanism 184. If an error condition (e.g., a parity error) is detected in a signal present at either AI port 141 or DO port 142, the corresponding error detector (181 or 182) will send an error report through error history tree 183 to actuate shutoff mechanism 184. Shut-off mechanism 184 then disconnects the supply of clock pulses from generator 110 to IU 120, EU 125 and MMU 130. Typically, there is a delay of approximately one to eleven clock cycles between the time an error is detected by error detectors 181 or 182 and the time that shut-off mechanism 184 actually halts the supply of system clock pulses to the IU, EU and MMU. Since the IU, EU and MMU are sequential state units, they advance forward from the states they were at when the error condition first occurred (and was detected by 181 or 182) to a subsequent state at which system clocks finally shut off.

The error reports from detectors 181 and 182 also go to the recovery control platform (ReCoP) 160. ReCoP 160 is independently clocked as indicated at 161 and thus it continues to operate even after pulses from system clock generator 110 are turned off by shut-off mechanism 184.

ReCoP 160 has a first signal associating means 162 for determining whether the IU 120 or MMU 130 was the initiator for an address signal $A_m$ present at cache AI port 141 when error detector 181 detected an error. Means 162 is drawn separately from ReCoP 160 for illustrative clarity, but is understood to be part of ReCoP 160. The label "PROCESS ID" is used at 162 to indicate that the signal associating means 162 performs the association shown in columns 171 and 172. It keeps track of who the initiator is for each $A_m$ signal flowing into port 141. When an error condition, which is denoted here as E(m)p, is detected to have occurred in machine cycle "m" and at signal passage point "p", (p being the cache AI port 141 in this case), the process associating means 162 determines whether the error-infected signal at that passage point, p (the AI port 141 in this case), is part of a process initiated by the IU 120 or part of a process initiated by the MMU 130.

A similar signal-associating means 166 is shown coupled to the cache DO port 142 for associating each data signal $D_m$ at that port with a process identification number (PROCESS ID). Means 166 is understood to be part of ReCoP 160 although it is drawn separately.

ReCoP 160 additionally has means (163,164) for associating each process with a process starting state and a beyond-retry state. More specifically, a first storage means is provided for retaining the starting point state of a current first process which was initiated by the IU, as indicated at 163a. Another storage means is provided for preserving the starting point state of a current second process which was initiated by the MMU, as indicated at 164a. Moreover, further storage areas 163b and 164b are provided and respectively associated with each process for indicating a post-error state, beyond which, the corresponding process is non-retriable. The ReCoP 160 uses the values stored in areas 163b and 164b to determine if the IU or the MMU has advanced to a state, subsequent to the error-occurrence state, beyond which it is no longer possible to simply step that initiator back to its starting point in order to correct the error by retrying. In such a case the retry region has to be enlarged, where possible, to include an initiator and/or initial state from which a retry can correct the error state.

While not shown, it is to be understood that further error detectors are provided at the DI port 143 of cache 140 and at corresponding data input, data output and address input ports of main storage unit 150. The corresponding process associating means for these other reports (the means similar to 162, 166) and the corresponding process state preserving means (means similar to 163a,b, 164a,b) are also included in the ReCoP 160 for each of these signal passage points.

Signals flowing along any of paths 121, 122, 123 and 126 are said to belong to an IU-initiated process. Signals flowing along paths 131, 132 or 133 are said to belong to an MMU-initiated process. The paths of corresponding control signals such a memory read/write enables are not shown for the sake of illustrative simplicity, but it is to be understood that the same association is made between each control signal and a process initiator.

After an error is detected in computer system 100 and system clock pulses are turned off by shut-off mechanism 184, the ReCoP 160 is assigned the task of determining whether the error condition is associated with an IU-initiated process, or a MMU-initiated process, or some other process initiator.

If the error is deemed to be most-immediately associated with an IU-initiated process, then any concurrently ongoing MMU-initiated process is allowed to continue without interference from ReCoP 160. The ReCoP 160 limits its retry activities to signals and states belonging to the IU-initiated process. Similarly, if the error condition is most immediately associated only with an MMU-initiated process, a concurrently running IU-initiated process is allowed to proceed without interference from the ReCoP 160.

The recovery control platform (ReCoP) 160 traces each error condition back to the physical location where it first occurred by following the error signal path back to the original error detector (e.g., 181 or 182). The ReCoP 160 then determines what piece of data was at the physical location (e.g., at AI port 141 or at DO port 142) at the time of error detection and further, what process that signal was most-immediately associated with (by way of associating means 162 or 166). Trace back to the correct error detector is accomplished by way of the error history tree 183 and a scan mechanism 168 that is part of the ReCoP 160. A description of error history methodologies may be found in the above-cited copending application of Satterlee, et al., which is incorporated herein by reference. A description of the scan mechanism 168 may be found in the above-cited copending application of Edwards, et al., which is also incorporated herein by reference.

The recovery control platform (ReCoP) 160 next uses the scan mechanism 168 (after system clock pulses from 110 shut off) to inspect the current state of the process-initiator (IU 120 or MMU 130) and other components (e.g., cache 140, MSU 150) within the boundaries of the process retry region. At such time, the ReCoP 160 determines whether the initiator or corresponding other components of the retry region has/-have advanced to a state beyond a point where it is no longer possible to correct the error by retrying just that process alone. This can happen because of the latency between error detection and clock shut-off. Storage units such as 163b and 164b provide the necessary information for making this decision.

If the process most-immediately associated with the error-corrupted signal (e.g., $A_m$) has moved beyond its non-retriable point, then a subsuming process which incorporates the beyond-retry process has to be reviewed to see if it is retriable. If not, a larger retry region is tested and so on. If none are retriable, transparent error recovery might not be possible. In such a case, the retry control platform 160 sends a machine check signal to a system console (not shown) indicating that a non-retriable error has occurred.

If, on the other hand, the first considered process is still within a retriable phase, the retry control platform (ReCoP) flushes out error-infected signals from the associated signal paths of the errant process and initializes or steps back components within the retry region to the most-immediate starting state of the process using the information held in storage units 163a and 164a.

The retry control platform 160 then sends a clock start command to shut-off mechanism 184 to restart the supply of clock pulses from generator 110 to the IU, EU, and MMU. The error-infected process is retried from its start point while other processes within computer system 100 continue uninterrupted. (While system clocks are off they do nothing. After system clocks are restarted, they continue as if clock stoppage never occurred.)

By now, the advantages of this approach should be fairly apparent. If an error infects a signal Within a process initiated by MMU 130, recovery activities are directed only to the components within the retry region controlled by MMU 130 (the cache-coherency maintaining region). Time is not wasted stepping back components outside of this retry region to an initial state and operations ongoing outside the retry region are not slowed down by unnecessary retries.

Figure 2:
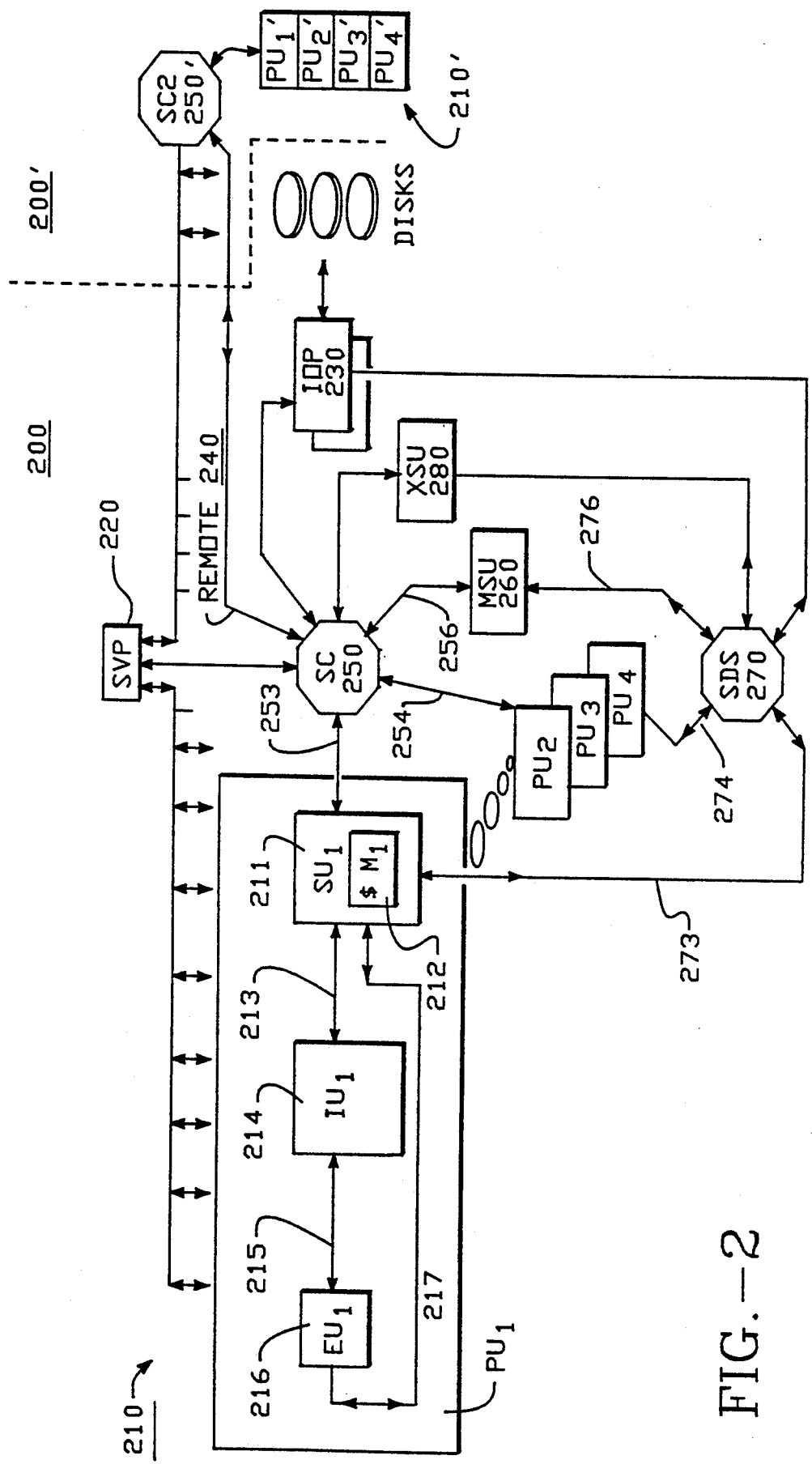
FIG. 2 is a block diagram of a second, multiprocessor computer which incorporates a retry platform in accordance with the invention.

FIG. 2 shows a multi-processor computer system 200 in accordance With the invention. System 200 includes a group 210 of four processor units which are respectively labelled as $PU_1$, $PU_2$, $PU_3$, and $PU_4$. Only the internal structure of $PU_1$ is shown. It is to be understood that processor units $PU_2$, $PU_3$ and $PU_4$ have similar internal structures.

Computer system 200 additionally oomprises a service processor (SVP) 220, a group 230 of Input/Output Processors ($IOP_1$, $IOP_2$), a system control unit (SC) 250, a remote coupling unit 240, a system data switch unit (SDS) 270 and a main storage unit (MSU) 260, an expansion storage unit (XSU) 280, intercoupled as shown. Remote coupling unit 240 optionally couples the illustrated computer system 200 to a like-structured, mirror-image system 200' (not shown in full detail). When computer system 200 is coupled to its mirror-image twin 200', the combination is referred to as a two-sided system. If system 200 is not so coupled, then it is referred to as a one-side system.

The system control unit (SC) 250 coordinates the exchange of control and data signals between the MSU 260 and/or the XSU 280 and/or other parts of the computer system 200/200'. The SDS 270 serves as a common data path for exchanging data between units. SDS 270 is in essence a crossbar router whose resources are under the control of the system control unit (SC) 250.

Control signals move through the SC 250 while corresponding data signals move through the SDS 270.

By way of example, when a storage control unit (SU 211) inside one of the processor units (e.g., $PU_1$) wants to fetch data from the MSU 260, the storage unit ($SU_1$) sends a request to the SC 250 indicating the address of a data block within the address space of MSU 260 where the desired data resides and asking the SC 250 to transfer that block, through the SDS 270, as soon as transfer resources (crossbar routing paths) within the SDS 270 become available.

Each processor unit (PU) has its own storage unit (SU) and each respective SU of each processor unit 210 can independently request data from the MSU at the same time. The SVP 220, IOP's 230 or remote system 200' can also send requests for access to MSU data at the same time. The SC 250 is responsible for prioritizing all received requests and servicing them in turn. It is to be noted that, when a two-sided system is employed, requests can come by way of remote connection 240 and twin system controller (SC2 250') from the processor units of the remote side ($PU'_1$, $PU'_2$, $PU'_3$, $PU'_4$).

Referring more specifically to the internal structure of the first processor unit ($PU_1$) it is generally divided into three sections, a storage unit ($SU_1$) 211, an instruction unit ($IU_1$) 214 and an execution unit ($EU_1$) 216. A cache memory unit ($SM_1$) 212 is included within $SU_1$ 211.

Data signals flow over bus 273 between the cache memory ($\$M_1$) 212 of storage unit 211 and the SDS 270. Control signals flow over bus 253 between the system controller (SC) 250 and $SU_1$ (211). Cache-to-mainstore coherency is maintained in cache memory ($SM_1$) 212 by way of a loop formed by $SU_1$ (211), SC (250), MSU (260) and SDS (270).

Within $PU_1$, the instruction unit ($IU_1$) and execution unit ($EU_1$) communicate with the cache memory ($\$M_1$) 212 by way of buses 213 and 217. In terms of an overview, $IU_1$ (214) fetches OP codes from the $SU_1$ by way of bus 213, it then decodes the OP codes and sends decoded control signals to $EU_1$ (216) by way of bus 215. Additionally, $EU_1$ (216) fetches operands from the $SU_1$ by way of bus 217 and forwards these fetched operands to a register file (not shown) within $IU_1$ (214) by way of bus 215. The $IU_1$ (214) returns operand data, as needed, to the $EU_1$ (216) over bus 215 during the execution of instructions. The $EU_1$ then returns execution results by way of bus 217 back to the $SU_1$ (211) for storage in the cache memory $\$M_1$ (212).

It should be apparent from the earlier discussion that the $SU_1$ (21) participates in two logically distinct processes, the first being cache-to-mainstore coherency maintenance and the second being operand-fetch and result-writebacks from the $IU_1/EU_1$ combination. It should also be apparent that when an error condition is detected in one of the signals flowing through $SU_1$ (211) that the recovery platform (which is included within SVP 220, as will be seen shortly) determines which process is specifically infected by the error condition and focuses its retry efforts, where possible, on that one process without interfering with other non-infected processes.

If an error condition infects the $IU_1/EU_1$ complex, the recovery platform goes one level deeper in localizing the operation-slowing effects of error containment and error recovery. More specifically, when an error condition is detected within a local region, the operations of the local region are frozen (e.g., by stopping local clocks) to contain the error-infection in the local region. Non-infected work-in-process continues in other regions where clocks have not stopped. The status of error-infected signals is saved for review after clock stoppage. In particular, control signals associated with error infected data (even if the control signals themselves are not error infected) are saved for analysis after clock stoppage. The recovery platform collects the data and determines therefrom, where in the machine the error condition first originated, how far the error infection has spread through the machine and what minimal amount of recovery action will eradicate the error infection (where such infection eradication is possible). This is better understood by now referring to FIG. 3.

FIG. 3 shows the structures of the $IU_1$ and $EU_1$ complex in more detail. Basically, a six-stage pipeline structure is employed. The six stages of the pipeline are respectively labelled D, A, T, B, X and W. The X stage is broken into two sections, X1 and X2. Stages D, A, T, B, and W are considered parts of the instruction unit ($IU_1$), while sections X1 and X2 are considered parts of the execution unit ($EU_1$). After the W stage, there are two non-executing stages, Z1 and Z2, which save status information flowing out of the W stage and preserves such information for at least two cycles.

Error-free instruction execution occurs generally as follows. An OP code-fetch address $A_{11}$ is sent during a first machine cycle (which cycle is arbitrarily labelled here as m=11) over bus 213a to an address input (AI) port of $SU_1$ (211). Subsequently, a corresponding OP code signal $D_{12}$ moves out of a data output (DO) port of $SU_1$ (211), over bus 213b at a following clock cycle (arbitrarily labelled as m=12) to an upstream end of the D stage. As OP code signal $D_{12}$ moves into the D-stage, a copy of its associated address signal, $A_{11}$, shifts into the pipeline in parallel with OP code signal $D_{12}$ This copy of the address signal $A_{11}$ is referred to as the "program status word" (PSW). The PSW shifts down the pipeline, from one stage to the next, in conjunction with the signals associated with the execution of the corresponding OP code $D_{12}$.

It should be noted that the above references to machine cycles such as m=11 and m=12 and further references below are relative rather than absolute. The subscripted labels attached to signals such as $A_{11}$ and $D_{12}$ imply the $D_{12}$ signal becomes valid after the $A_{11}$ signal becomes valid, but not necessarily one machine cycle apart. It can be any number of machine cycles afterwards.

Timing is important in the discussion of the PU signals. Each of the six stages (DATBXW) of the processor unit $PU_1$ (and also the non-executing stages Z1 and Z2) has an upstream registered input (that is, a front-end latch) which is clocked either by a system-wide series of gated clock (GK) pulses (referred to hereafter as the global gated clocks, GGK) 385 or a derivative of the GGK signal 385 (these derivatives are referenced as: DSGK, SUGK, IEGK, and they will be later explained).

The registered upstream input of each of the DATBXW pipeline stages is represented by a shaded cylindrical front-end segment in FIG. 3. Each shaded cylindrical segment is followed by a nonshaded cylindrical segment which represents a combinatorial logic portion of the same stage. The X2 section does not have an upstream registered end. It is purely combinatorial.

Since there are six pipeline stages for executing each instruction, DATBXW, and each stage has a registered front end, instruction execution takes a minimum of six machine cycles. The system-wide gated clock pulses (GGK) 385, incidentally, are output from the system clock generator 310 when a global gating switch (Gx) 384 is closed. Global gating switch (Gx) 384 is controlled by SVP 220. SVP 220 is independently clocked by clock generator 361. Each of the upstream registered inputs of the DATBXW stages is respectively clocked by a derivative of the global gated clock pulses (GGK) 385.

The GGK pulses 385 are supplied respectively to a IE recovery switch (IERx) 386 and to a storage unit recovery switch (SURx) 390. The other end of the IERx switch 386 produces so-called IE gated clock pulses (IEGK) 387. The IEGK signals 387 are supplied to D-stage recovery switch (DSRx) 388. The other end of the DSRx switch 388 produces so-called D-stage gated clocks (DSGK) 389.

While the DSRx switch 388 is closed, and the IERx switch 386 is closed and the Gx switch 384 is closed, DSGK pulses 389 are supplied to the front end of the D-stage, Similarly, while the SURx switch 390 is closed and the Gx switch 384 is closed, SUGK pulses 391 are supplied to the respective front end registers of the ATB stages. The SUGK clocks 391 are also supplied to synchronous components within the storage unit ($SU_1$) 211. Moreover, while the IERx switch 386 remains closed and the Gx switch 384 remains closed, IEGK pulses 387 are supplied respectively to the front ends of the X-stage, the W stage and the non-executing Z1 and Z2 stages. If an error condition is detected within a localized region, one of the recovery switches (e.g., DSRx, IERx, SURx) will open either immediately or shortly thereafter to halt clocks in the localized region and contain error infection in that region. The global clock switch Gx (384) reacts more slowly (usually it takes approximately 11 to 16 clock cycles to halt system-wide clocks) after an error condition is detected. But this is getting ahead of the explanation. We are still considering the situation where instructions are executed in an error-free manner through the pipeline.

Once an opcode signal $D_{12}$ is fetched from cache ($M_1$) 212 and loaded into the upstream registered input of the D stage, it is decoded by the D stage to produce a plurality of control signals, $C_{13}$ and $C_{14}$. An error detector (e.g., a parity checker) 313 is coupled to the downstream output of the D stage in order to test the validity of the output control signals C13 and C14.

Control signal $C_{13}$ is transformed by the A and T stages into an effective address signal (C19, not shown) which is supplied to the B stage. This effective address signal (C19, not shown) may be thought of as analogous to another address signal $A_{15}$, which earlier moves from the B stage over bus 213a to the AI port of the storage unit 211. In response, the storage unit 211 returns operand data $D_{16}$ over bus 213b back to the B stage. The fetched operand data $D_{16}$ is held in the B stage until the effective address signal (C19, not shown) references part or all of $D_{16}$ and then that referenced data moves out of the B stage to be output as corresponding operand data $D_{20}$. (For performance reasons, a block of operand data including $D_{16}$ is prefetched into a buffer within the B stage by way of anticipatory address signal $A_{15}$, and later, when the effective address (C19, not shown) is applied directly to the B stage buffer, data signal $D_{20}$ is produced shortly thereafter.)

In some embodiments, the AT-stage complex includes a translation-look-aside buffer (TLB) for storing the results of address translation. If address translation proceeds without error, the TLB will save a copy of the error free translation results. Similarly, when data is fetched out of the SU 211 without error, the internal buffer (not shown) of the B-stage will save a copy of the error-free fetched data.

An error detector (e.g., parity checker) 315 is positioned at the downstream output of the B stage for checking the validity of the operand data $D_{20}$ output from the B stage.

Operand data $D_{20}$ moves through a multiplexer 320a and $D_{20}$ is thereafter presented to the upstream registered input of the X1 section. At the same time that the $D_{20}$ operand data signal is loaded into the X1 front end register, a corresponding execution-control signal C20 moves through another multiplexer 320b into the X1 section. The X stage uses the signal output by multiplexer 320b to determine what execution operation (e.g., add, subtract, etc.) should be performed on the operand data supplied to it by multiplexer 320a. Execution-control signal C20 is derived from the D-stage control signal $C_{14}$ which passes through a delay means 319 (usually this means is included within the ATB complex). The delay of delay means 319 is set so that control signal $C_{20}$ arrives at the X stage in timely conjunction with the operand signal $D_{20}$ produced by the B stage.

Error detector 323 is provided for testing the validity of control signals ($C_{20}$) before they enter the X-stage. In terms of timing, the signals which are tested by detector 323 are considered to be within the realm of the B-stage because they have not yet entered the X-stage.

It is to be observed that a minimum of four machine cycles is consumed by the DATB stages to produce operand data signal $D_{20}$ and corresponding control signal $C_{20}$.

In response to the $C_{20}$ and $D_{20}$ signals, the X1 section produces intermediate result data $D_{23}$ which is tested for validity by error detector 325. The X2 section receives $D_{23}$ and responsively produces final result data $D_{25}$. The final result data $D_{25}$ is also tested for validity by error detector 325.

Final result data $D_{25}$ is then loaded into the W stage in a next stage cycle. Where required, the W stage outputs a further address signal $A_{29}$ to the AI port of storage unit 211 and a corresponding data signal $D_{30}$ to the DI port of storage unit 211 for storing the final execution results of the X stage (X1 and X2) back into the cache memory ($M_1$) 212. (Execution result data can also be written to internal registers of the $PU_1$ which are not shown.)

Error detectors such as 341 test the validity of signals flowing within the $SU_1$ 211. Further error detectors such as 351 test the validity of signals flowing through the SC/SDS complex 250/270.

The outputs of error detectors 313, 315, . . . , 351 respectively pass through relative delay paths 314, 316, . . . , 352 for collection in an error history OR means 383 which then supplies a collective error report to service processor (SVP) 220. Upon receipt of an error report from OR means 383, the SVP 220 issues a stop clock command to global clock-gating switch (Gx) 384 to thereby halt the production of gated clock (GGK) pulses 385. As a general rule, it takes more than four clock cycles (and usually a total of eleven to sixteen clock cycles) for global clocks GGK 385 to stop throughout the system. Delay 354 is drawn in FIG. 3 to show that the Gx recovery switch 384 opens in response to an error detection at a point in time which follows the more immediate opening of local recovery switches 386, 388 or 390.

Because of the nature of reporting paths 314, 316, . . . , 352, there is a finite delay between the time that one of error detectors 313, 315, . . . , 351 detects an error condition and the time that global gated clocks (GGK) 385 actually stop. If the global clock switch Gx (384) is the only means used for error containment, error infected data within the DATBXW pipeline can move downstream by a substantial distance from the point where it first occurred to a latter part of the pipeline. The amount of spread depends on the delay of the error reporting path and the position of first error occurrence.

Where possible, more localized form of error containment is provided. For example, if an error condition is detected in a signal passing through test point 312, error detector 313 immediately (or almost immediately) sends a signal to the DSRx switch 388 commanding that switch to open. The substantial immediacy of this reaction is indicated by zero delay symbol 314. (It is to be understood that the delay value is relative only and will vary from case to case. There is always some finite amount of delay between error detection and switch opening. The idea here, is that the DSRx switch 388 opens as soon as possible after detection of an error at test point 312.) The DSRx switch 388 should open fast enough so that the operations of the D-stage halt before the D-stage can send error-infected control signals ($C_{13}$ and $C_{14}$) downstream to the subsequent ATB complex and the X-stage. The SUGK clocks 391 and IEGK clocks 387 continue uninterrupted. As a result, work already in process in the downstream ATBXW stages continues to move out of the pipeline into the $SU_1$ (211) or into other internal registers (not shown) of the processor unit ($PU_1$)

A more delayed version of the error report from detector 313 moves through error history tree 383, through the SVP 220 and through conceptual delay 354 to eventually open the global clock gate Gx 384 some eleven to sixteen clock cycles later. By that time, error-free data will have already flushed out from the ATBXW stages toward designated destinations. The ATBXW stages will not produce any further results, however, because the D-stage does not supply any further control signals ($C_{13}$ and $C_{14}$) after its clocks (DSGK) halt.

After global clocks (GGK) 385 halt, the recovery platform 360 (within SVP 220) scans the error history tree (using scan means 368) and in this way determines that first error was detected by detector 313 to have occurred within the D-stage and that error infection Was contained within the D-stage by the immediate action of the DSRx switch 388. In such a case, the recovery platform 360 confines its recovery actions to components of the D-stage, resetting or reconfiguring the components as needed to retry the instruction corresponding to the program status word (PSW), within the D-stage. As soon as these operations are completed, the SVP 220 clears the error history tree 383, closes the DSRx switch 388 and finally closes the global switch Gx 384, thereby restarting operations in the system.

Of importance, it should be noted that the time spent by the recovery platform 360 in correcting the error, was minimized because error-infection spread was contained within the local region of the D-stage and the recovery platform 360 confined its recovery activities to that local region.

Global clocks (GGK) 385 are therefore turned back on in minimum time. This is advantageous because other parts of the system 200, such as the I/O processors 230 (refer back to FIG. 2) operate under protocols which generate time-out error procedures if certain handshakes are not returned within predefined time limits. The general time limit within system 200, for example, is 800 milliseconds (800 mS). If an error condition occurs within, and is confined within $PU_2$, but global clocks 385 remain shut off for more than 800mS because it takes the SVP 220 that much time to correct the error, the IOP's 230 will next report a time-out error after clocks are turned back on. The disk units will complain that they have not received appropriate handshakes within the required 800 mS time limit. This slows overall system performance. On the other hand, if global clocks GGK (385) are turned back on within the 800 mS time limit, the disk units will never realize that recovery occurred, the IOP processes will continue without flagging an error, and overall system performance will not be impeded because error recovery activities were required in a particular, localized region (e.g., within $PU_2$).

Referring back to FIG. 3, suppose as a further example, that a noise spike infects the intermediate result data $D_{23}$ output by the X1 section. Suppose additionally, that the $D_{20}$ and $C_{20}$ signals developed by the upstream DATB stages are error-free. Assume moreover, that the W stage has not yet sent the corresponding result data $D_{30}$ to the storage unit ($SU_1$) 211 at the time that gated clocks (GGK) 385 stop in response to an error report issued by detector 323 through path 324 and OR means 383 to the SVP 220.

Under the traditional approach, the entire instruction would be retried at least from the point where the OP code address signal $A_{11}$ is sent to the storage unit and OP code data $D_{12}$ is first returned to the instruction unit (IU). In pipelined systems, a downstream instruction flow which has not yet left the W stage would also have to be retried. Moreover, all upstream instructions which follow the error-infected instruction into the pipeline would also have to be retried.

However, under principles of the invention, error detector 325 sends a clock stopping signal to the IERx switch 386 by way of delay 326. The IERx switch 386 opens one clock cycle after the error condition is detected by error detector 325. During this interim, error-free results within the W stage move forward to the $SU_1$ (211) and/or to other designated internal registers of $PU_1$. Additionally, the status of those results shift into the status saving stage Z1. (The Z1 and Z2 stages are clocked by the IEGK clocks.)

Global clocks (GGK) 385 halt a number of cycles later as a result of the error signal from detector 325 moving through error history tree 383 to the SVP 220 and to global switch (Gx) 384. The recovery platform (ReCoP 360) which is implemented within the SVP 220, recognizes 10 that the $D_{20}$ and $C_{20}$ signals developed by the DATB stages were error-free and it also determines that the non-infected work already performed by the DATB stages should not have to be re-performed. The only operations that have to be re-tried are the error-infected ones which occurred in the X1 section and X2 sections. Subsequent pipeline operations already in progress in the DATB stages do not have to be discarded because a noise spike infected the intermediate result signal $D_{23}$ at the output of the X1 section.

In one embodiment, each processor unit (e.g., $PU_1$) of system 200 includes a first shadow pipe 328 interposed between the output of the B stage and the input of multiplexer 320a, plus a second shadow pipe 329 interposed between the output of the D stage and multiplexer 320b. Each of shadow pipes 328 and 329 is a queue or FIFO (first in/first out) buffer having sufficient storage capacity to store the output results of the D and B stages over at least sixteen machine cycles. The results respectively output by the D and B stages between the time that each stage was still outputting valid results and the time when a subsequent error was detected and gated clocks (GGK) 385 stopped are stored respectively in the shadow pipes 328 and 329.

In managing an error recovery, the recovery platform 360 outputs a control signal 321 to multiplexers 320a and 320b which will later cause (when gated clocks GGK are turned back on) each of multiplexers 320a and 320b to route the output of its respective shadow pipe, 328 and 329, to the X1 stage. The ReCoP 360 flushes out error-infected signals from the X1, X2 sections and the W stage, and then restarts the gated clocks (GGK). The W stage begins processing the result data that consequently enters it as a result of the queued operand data $D_{120}$ and control $C_{120}$ signals that are output from the shadow pipes 328 and 329 over the next few machine cycles. Signals $C_{120}$ and $D_{120}$ are replays of the earlier produced, error-free signals, $C_{20}$ and $D_{20}$.

At the point in time where the error-free replay signals empty out from shadow pipes, 328 and 329, the multiplexer control signal 321 flips back to its original state, thereby bypassing the shadow pipe 328 and 329 and allowing normal pipeline operations to proceed in the DATBXW stages.

It is to be noted that recovery activities were localized to the X and W stages plus the shadow ends of the D and T stages. The front end of the IU was not affected and the activities of the SU were not affected except for the fact that gated clocks (GGK) were shut off while the ReCoP 360 analyzed the error condition and directed its recovery activities primarily to the local of the error-infected parts.

In a second embodiment of the invention, the shadow pipes, 328 and 329, are not employed. Instead, it is recognized that error-infected copies of work performed by the ATB complex is already contained within the look-aside translation buffer (LTB) and the buffer within the B stage. The recovery platform 360 resets pointers within the ATB complex to replay the error-free signals $D_{120}$ and $C_{120}$ back to the X stage. There is no multiplexer 320a, 320b, and there is no need for a mechanism which twice flips such a multiplexer 320a, 320b back and forth between first and second states.

The above retry localization mechanism is not always possible. Suppose that by the time the local gated clocks of a retry region and/or the system-wide gated clocks (GGK) 385 stop in response to an error report, infected data has already spread downstream beyond the boundaries of the processor unit ($PU_1$). Assume, for example, that the W stage has already sent error-infected result data $D_{30}$ to the storage unit ($SU_1$) 211 or worst yet, the storage unit has forwarded the error infected data to the SC/SDS complex 250/270 for storage in mainstore unit (MSU) 260. At that point, the recovery platform 360 has to clear the error infected data out of a larger retry region. More time will be required for error recovery.

Also, when error-infected data moves out of a single-ended region, such as a PU, into a shared region, such as the SU, an explicit tag is added to indicate that the data is infected with error (a so-called "data-in-error" DIE bit) and where possible, to indicate the process to which the error-infected data belongs. The cache memory ($M) within the storage unit, for example, is a resource which is shared by processes executing in the PU and also requests coming in from the SC/SDS complex 250/270. While data moves down the DATBXW pipeline, its initiator is inherently known to be the corresponding IU of the processor. The corresponding initiator state is inherently represented by the program status word (PSW) which travels down the pipeline together with the data. For the first few cycles after data enters the SU, its corresponding status is saved in the non-executing Z1 and Z2 stages. A tracking mechanism within the ReCoP 360 keeps track of the fact that the data came from a process initiated by $IU_1$.

Referring momentarily back to FIG. 2, it is seen that data can equally enter $SU_1$ from processes initiated by $IU_2$, $IU_3$ or $IU_4$ of the first side or even from processes initiated by the twin IU elements in the remote side 200'. Moreover, the IOP's 230 can be process initiators. Each process initiator can cause data to enter the cache memory ($\$M_1$) 212 of storage unit $SU_1$.

If error-infected data is discovered within $SU_1$ 211 before it merges into cache memory 212, the error-infected data can be easily traced back to $IU_1$. Error detector 341 immediately signals SURx switch 390 to halt the SUGK clocks 391. Operations then halt in $SU_1$ 211 and in the ATB complex. Detection of error-infected data in the $SU_1$ 211 implies that there may be a copy of the error-infected data in the B stage and vice versa. Accordingly, the ATB complex and the $SU_1$ are considered to be a unitary error-containing region. Recovery could begin with the shadow piped data as before, but there is a point of diminishing returns where the benefits of localizing error recovery microscopically to a point starting at the X1 section and moving downstream along the pipeline and into the SU and SC/SDS complex is no longer worthwhile. When that point is reached, the recovery platform 360 recognizes it and switches into a mode where, assuming the initiator of the error-infected process is deemed to be the PU, error recovery begins with the start of the error-infected instruction (or if needed, with the start of an error infected sequence of instruction level software code and proceeds downstream from there).

The retry localization process involves a further detail which needs to be explained. Upon receipt of each error report from the error history tree 383, the recovery platform 360 has to figure out where error infection first began and it further has to determine whether it has already retried an operation or whether it is doing so for the first time.

The first time that an error is detected by any of detectors 313, 315, . . . , 351, the SVP 220 stops gated clocks by way of clock-gating switch 384. The SVP 320 then uses scan means 368 (considered part of recovery platform 360) to scan through the error history tree (which tree is represented by OR means 383 and delay pass 314, 316, . . . , 352). The SVP 220 can determine from such scanning where an error first occurred and how far down the pipeline error infected data has spread (for example, whether it has progressed past the W stage).

If the SVP 220 determines that error infected data has been contained within the retry region ending at the output of the W stage, the SVP turns on a begin-retry-mode latch (not shown) associated with a localized retry region encompassing just the EU and the tail end (shadow end) of the IU. The SVP 220 then clears out the error history tree 383, flips multiplexer control line 321 to begin executing out of the shadow pipes 328 and 329 and waits to see if an error is again reported by the error history tree 383 during the retry If no, the SVP 220 switches out of the shadow pipe mode at the end of the error-free retry, resets the begin-retry-mode latch (not shown) associated with retry region of the EU and shadow end of the IU. The SVP 220 thereafter allows machine operations to continue normally from that point on. However, if an error is detected while the begin-retry-mode latch of the local process is set, the recovery platform 360 within the SVP 220 sends an error status report to an operating system program which then determines whether there is some other way to self-correct out of the error condition. By way of example, the retry region might be expanded to cover just the IU/EU complex. Or, if the error infection has spread further, the retry region might be expanded to cover the IU/EU complex, the SU and the SC/SDS complex. If error-infected data has spread further, say to the MSU 260, then the retry region would be further expanded to begin at the IU/EU complex 210, and further cover the SU 211, the SC/SDS complex 250/270, and the MSU 260. If retry is not possible in this larger region, the recovery platform turns recovery control over to a higher-level operating system (see FIG. 4). If the operating system cannot recover out of the error condition (e.g., by using a checkpoint-like approach, a nontransparent machine check has to be taken. Generally, a separate begin-retry latch is provided for each retriable process.

Just as retry activities can be confined to a small region (e.g., EU and shadow end of IU) which has been infected by a locally contained error condition (e.g., one arising at the point checked by error detector 323), when an error condition occurs within a more upstream part of the IU (at point 312, for example), and clocks (GGK) halt before the error condition spreads into the SU 211, the retry activities of ReCoP 360 can be similarly confined to the IU/EU complex without extending into the SU 211. Error-free signals which are already progressing forward at a more downstream end of the DATBXW pipeline are allowed to write execution results into the SU 211 when clocks (GGK) are later turned on. The more upstream signals of the DATBXW pipeline, which are infected with an error condition, are locked out and the W stage consequently ignores them and does not send erroneous result data to the SU 211. Execution is restarted from the D stage. This set of activities does not interfere with the operations of the SU 211, and accordingly, cache-coherency operations continue once the gated clocks (GGK) are restarted. SU 211 operations proceed without notice of the fact that an error condition occurred in the IU/EU complex.

Assume alternatively, that an error condition is detected by error detector 341 for a data signal passing inside the $SU_1$ (211) and assume that the error-infected data signal is associated with a process for which the first processor unit $PU_1$ is the initiator. If it is too late to replay the data processing out of the shadow pipes, 328 and 329, the retry point is moved back to the D stage of $PU_1$ and the error-infected operation is replayed from that point on. $IU_1$ is deemed to be the process initiator.

Assume that error detector 351 detects an error condition in a data signal passing through the SC/SDS complex 250/270 and the error-infected signal is associated with a process for which the instruction unit ($IU_1$) of the first processor unit ($PU_1$) is the initiator. Error-infected signals are flushed out from a region including all of $IU_1$ and $EU_1$, all the signals within $SU_1$ which belong to the error-infected process of IU₁ and all the signals within the SC/SDS complex 250/270 which belong to the same error-infected process. IU₁ is loaded with process initializing signals (e.g., A₁₁) and the process is retried from that point forward. If error infection has spread further, a larger retry region with the same initiator and initial state is used.

Referring to FIG. 4, a graphical illustration of this concept is shown, Dashed boundary 416 indicates the extent of retry activities when an error condition is found to be contained within the $EU_a$ and $IU_a$ complex where the shadow end of $IU_a$ is the initiator of the error-infected process. (The subscript "a" in the notations $EU_a$ and $IU_a$ represents one of the possible identifiers, 1, 2, 3, or 4 here.)

Dashed box 417 shows the extent of retry activities when an error condition is found to be contained within the $IU_a/EU_a$ complex and the front end of $IU_a$ is deemed to be the process initiator. If recovery efforts cannot be confined to an inner retry region such as 416, the recovery process "bubbles out" to an enveloping retry region. Bubble-out path BO1 illustrates the bubbling out process from region 416 to region 417.

Dashed boundary 418 shows how retry activities are expanded to include $SU_a$ when an error-infected signal is found within $SU_a$ and associated with a process for whom the front end of $IU_a$ is the initiator. Bubble-out path BO2 shows how recovery activates expand from region 417 to its enveloping region 418.

Solid boundary 419 defines the maximum retry region for a process having $IU_a$ as its initiator. If it is not possible to correct an error within the IU maximum retry region 419, recovery efforts bubble-out as indicated by path BO3 to a software-based checkpoint style region 490. There may be a software checkpoint from which it is possible to retry operations and correct the error.

At this juncture, it should be noted that not every recovery attempt will be successful. In recognition of this, every error-infected dataword is marked as such by setting its "data-in-error" (DIE) bit. If a process initiator (ProI) cannot be associated with the error infected dataword, at least the recipient of the dataword will know that the error exists. The recipient can then report back to control software and the control software (operating system) can then attempt to take corrective actions at a software level above that of the recovery platform.

If an error condition is detected by one of the error detectors and the hardware cannot identify which pieces of data were infected, and the initiator of the error-infected process cannot be identified either, then the integrity of data within the system is compromised. In such a case, global clocks (GGK) 385 are left off after being shut by the error history tree and the error condition becomes nontransparent to end users. Essentially, the system "crashes" and system operators have to figure out how to bring back data integrity.

Referring to the storage unit $SU_a$ (211) shown in FIG. 4 (where the "a" of $SU_a$ represents one of identifiers 1, 2, 3 or 4), it is to be noted that each such storage unit of a corresponding processor unit ($PU_a$) includes a corresponding memory management subunit $MMU_a$. The memory management subunit $MMU_a$ is responsible for managing cache coherency operations between the local cache memory ($RU_a$) and the main storage unit (MSU) 260.

Dashed boundary 410 indicates the extent of retry activities when an error-infected signal associated with a process having $MMU_a$ as its initiator is detected within $SU_a$.

Solid boundary 411 shows the maximum extent of retry activities for error-infected signals belonging to a process initiated by $MMU_a$. Such error-infected signals may be found in the SC/SDS complex 250/270 or in the MSU 260. If recovery efforts are not successful within the MMU retry region 411, then recovery efforts bubble-out, as indicated by path BO5, to the IU retry region 419. If recovery efforts are not successful in that region, then they bubble out further to the software checkpoint region 409 as indicated by path BO3. If recovery is not possible within region 490, the system has to be brought down in a non-transparent manner.

Similarly, error-infected signals may be found in the SC/SDS complex 250/270 or in the MSU 260 or in the XSU 280 where these error-infected signals belong to a process having $IOP_a$ (230) as its initiator. (Recall that there are two input/output processors in each side and thus, "a" represents either the value 1 or 1', 2 or 2' here.) Solid boundary 430 defines the maximum extent of retry activities for error-infected signals having $IOP_a$ as the associated process-initiator. If recovery attempts are not successful within the IOP retry region 430, then recovery efforts bubble-out as indicated by path BO7 to the software retry region 490.

The extended storage unit (XSU) 280 does not initiate process activities of its own, but it does receive service requests from a number of independent initiators, including all the PU's of its local side 200, all the IOP's in the local side, and also from the corresponding twin initiators in the remote side 200'. Solid boundary 480 represents the extent of retry activities for error infected signals found within the XSU 280. There are error-containing mechanisms within the XSU 2BO just as there are within each PU and each of the IOP's. The recovery platform 360 first tries to confine its recovery activities to the local region 480. If this is not possible, recovery activities "bubble-out" from region 480 into one of the enveloping retry regions. If the error-infected data belongs to a IU-initiated process, then recovery activities bubble out to the corresponding IU retry region as indicated by bubble-out path BO8. If the error-infected data within the XSU 280 belongs to an IOP-initiated process, then recovery activities bubble-out to region 430 as indicated by path BO9. The process-initiator can be located either in the local side 200 or the remote side 200, In addition to considering specific hardware components such as the IU, the MMU, the IOP and the XSU as process-initiators, portions of the software which initiate activities within these or other hardware components of system 200 can also be thought of as process initiators. Solid boundary 490 defines the extent of retry activities for error-infected signals having a specific segment of software deemed as the process-initiator.

The above disclosure is to be taken as illustrative of the invention, not as limiting its scope or spirit. Numerous modifications and variations will become apparent to those skilled in the art after studying the above disclosure.

Given the above disclosure of general oonconcepts and specific embodiments, the scope of protection sought is to be defined by the following claims.

What is claimed is:

1. An error recovery mechanism for use in a data processing system, wherein the data processing system has one or more data processing resources and a plurality of process initiators which can initiate plural, concurrent processes using the one or more data processing resources, wherein the one or more data processing resources each receives one or more input signals and responsively outputs one or more output signals, and wherein one or more of the data processing resources is a shared resource which can receive time-multiplexed input signals respectively belonging to two or more of the plural concurrent processes, and which can responsively output time-multiplexed output signals respectively belonging to the two or more of the plural concurrent processes, the responsive output of an earlier-timed input signal developing within or being output from the shared resource simultaneously with the application to the shared resource of a later-timed input signal;

said error recovery mechanism comprising:

signal-to-initiator associating means for associating each time-multiplexed signal that is input to or output from a shared resource with a corresponding one of the plurality of process initiators and with a corresponding initiating state of the associated initiator;

error detecting means for detecting error conditions in time-multiplexed signals input or output from a shared resource and for associating each such detected error condition with its corresponding error-infected signal which is in turn associated with a particular process initiator; and retry control means for initiating process retry from the process initiator and corresponding initiating state of a process with which an error-infected, time-multiplexed, input or output signal is associated;

wherein the data processing system is a synchronous machine that steps through consecutive machine cycles in synchronism with a system clock; and wherein the one or more shared resources each receive interleaved input signals respectively belonging to two or more of the plural processes in consecutive machine cycles, and responsively output interleaved output signals respectively belonging to the two or more of the plural processes in successive machine cycles.

2. An error recovery mechanism according to claim 1 further comprising:

error-infection confinement means, operatively coupled to the error detecting means, for halting selected operations of the data processing system upon detection of an error condition in one of said time-multiplexed input or output signals and by such selective halting, confining error-infection to a localized region of the data processing system; and recovery localizing means for confining recovery activities to the local region in which error-infection has been contained.

3. An error recovery method comprising the steps of:
dividing a computer into a plurality of retry regions;
assigning a component within each retry region as a process initiator responsible for initiating a process contained within the retry region;
upon the occurrence of an error condition inside a retry region, localizing retry activities to the process initiator and subsequent error-infected parts of the retry region;
detecting conditions when localizing retry activities within a small retry region will not be sufficient to correct and error condition; and
successively bubbling-out to enveloping retry regions if recovery will not be successful in an enveloped retry region.

4. An error recovery mechanism according to claim 1 wherein:
one of the shared data processing resources is a shared memory resource;
two of the process initiators are respectively, an instruction unit (IU) and a memory management unit (MMU); and
the IU and MMU initiate transmissions of a stream of respective and interleaved, address input (AI) and data input (DI) signals to the shared memory resource.

5. An error recovery mechanism according to claim 1 further comprising:
system shutoff means for halting operations of the data processing system; and
error history means, driven by the error detecting means and operatively coupled to the system shutoff means, for initiating the halt of operations of the data processing system upon detection of a first of one or more error conditions by the error detecting means;
wherein the halt of operations of the data processing system occurs over a finite time period in which an error condition can propagate from one data processing resource to a second data processing resource; and
wherein the retry control means includes error-infected signal tracking means for keeping track of the identity of the process initiator for each error-infected signal produced as a consequence of the first detected error condition.

6. An error recovery mechanism for use in a data processing system,
wherein the data processing system has one or more data processing resources and a plurality of process initiators which can initiate plural, concurrent processes using the one or more data processing resources,
wherein the one or more data processing resources each receives one or more input signals and responsively outputs one or more output signals, and
wherein one or more of the data processing resources is a shared resource which can receive time-multiplexed input signals respectively belonging to two or more of the plural concurrent processes, and which can responsively output time-multiplexed output signals respectively belonging to the two or more of the plural concurrent processes, the responsive output of an earlier-timed input signal developing within or being output from the shared resource simultaneously with the application to the shared resource of a later-timed input signal;
said error recovery mechanism comprising:
signal-to-initiator associating means for associating each time-multiplexed signal that is input to or output from a shared resource with a corresponding one of the plurality of process initiators and with a corresponding initiating state of the associated initiator;

error detecting means for detecting error conditions in time-multiplexed signals input or output from a shared resource and for associating each such detected error condition with its corresponding error-infected signal which is in turn associated with a particular process initiator;

retry control means for initiating process retry from the process initiator and corresponding initiating state of a process with which an error-infected, time-multiplexed, input or output signal is associated;

system shutoff means for halting operations of the data processing system; and error history means, driven by the error detecting means and operatively coupled to the system shutoff means, for initiating the halt of operations of the data processing system upon detection of a first of one or more error conditions by the error detecting means;

wherein the halt of operations of the data processing system occurs over a finite time period in which an error condition can propagate from one data processing resource to a second data processing resource;

wherein the retry control means includes error-infected signal tracking means for keeping track of the identity of the process initiator for each error-infected signal produced as a consequence of the first detected error condition; and wherein the retry control means further comprises:

beyond-retry tracking means for keeping track of a beyond-retry state for each of the process initiators, the beyond-retry state being a state in a sequence of states, beyond which it is no longer possible to correct an error by retrying from the initiating state of the associated initiator.

7. An error recovery mechanism according to claim 6 wherein one of the plural processes can subsume a lower-level other one of the plural processes and wherein the retry control means further comprises:

bubble-out recovery means, responsive to the beyond-retry tracking means, for determining if an error-infected processor beyond its retry point is subsumed by a higher level process and for expanding retry efforts to the higher level process in such a case.

8. A pipelined processor unit having a localized error containment feature, said processor unit comprising a succession of pipeline stages including:

an instruction decoder stage for decoding a stream of supplied instruction signals and producing corresponding control signals, the instruction decoder stage operating in response to a first gated clock signal;

an operand address and fetch stage, responsive to a first subset of the control signals produced by the instruction decoder stage, for addressing and fetching operands specified by the supplied instruction signals, the operand address and fetch stage operating in response to a second gated clock signal;

said processor unit further comprising:

first error detecting means, operatively coupled to the instruction decoder stage, for detecting error conditions in the produced first control signals of the instruction decoder stage;

second error detecting means, operatively coupled to the operand address and fetch stage, for detecting error conditions in the fetched operands of the operand address and fetch stage;

first local clock halt means, operatively coupled to the first error detecting means, for halting the supply of the first gated clock signal to the instruction decoder stage with substantially minimal delay upon the detection by the first error detecting means of an error condition in a produced control signal of the instruction decoder stage; and second local clock halt means, operatively coupled to the second error detecting means, for halting the supply of the second gated clock signal to the operand address and fetch stage with substantially minimal delay upon the detection by the second error detecting means of an error condition in a fetched operand of the operand address and fetch stage.

9. A pipelined processor unit according to claim 8 further comprising:

first shadow means, operatively coupled to the instruction decoder stage, for storing a second subset of the control signals produced by the instruction decoder stage over a predefined plurality of machine cycles; and second shadow means, operatively coupled to the operand address and fetch stage, for storing the stream of operands fetched by the operand address and fetch stage over said predefined plurality of machine cycles.

10. The pipelined processor unit of claim 9 wherein said predefined plurality of machine cycles is at least sixteen machine cycles.

11. The pipelined processor unit of claim 8 wherein said instruction decoder stage and said operand address and fetch stage are each operatively coupled to a shared storage unit for respectively fetching instruction codes and corresponding operands from the shared storage unit.

12. A pipelined processor unit according to claim 8 further comprising:

error report collecting means, operatively coupled to the first and second error detecting means, for producing a collective error report signal representing the detection of an error condition by either of the first and second error detecting means.

13. A pipelined processor unit according to claim 12 further comprising:

global clock halt means, operatively coupled to the error report collecting means, for halting the supply of both the first and second gated clock signals respectively to the instruction decoder stage and the operand address and fetch stage at a plural number of machine cycles after production by the error report collecting means of a collective error report signal.

14. A pipelined processor unit according to claim 8 wherein said succession of pipeline stages further includes:

an instruction execution stage, responsive to a second subset of control signals produced by the instruction decoder stage and to operands fetched by the instruction decoder stage and to operands fetched by the operand address and fetch stage, for generating result data in accordance with the second subset of control signals and the fetched operands, the instruction execution stage operating in response to a third gated clock signal;

said processor unit further comprising:

third error detecting means, operatively coupled to the instruction execution stage, for detecting error conditions in the generated result data of the instruction execution stage; and third local clock halt means, responsively coupled to the third error detecting means, for halting the supply of the third gated clock signal to the instruction execution stage one machine cycle after the detection by the third error detecting means of an error condition in a generated result data of the instruction execution stage.

15. A pipelined processor unit according to claim 14 wherein said succession of pipeline stages further includes:

a result writeback stage, operatively coupled to the instruction execution stage, for writing result data to storage, the result writeback stage operating in response to said third gated clock signal;

said processor unit further comprising:

fourth error detecting means, operatively coupled to the result writeback stage, for detecting error conditions in the written-out result data of the result writeback stage; and wherein the third local clock halt means is responsively further coupled to the fourth error detecting means for halting the supply of the third gated clock signal to the result writeback stage with substantially minimal delay upon the detection by the fourth error detecting means of an error condition in written-out result data of the result writeback stage.

* * * * *

UNITED STATES PATENT AND TRADEMARK OFFICE
CERTIFICATE OF CORRECTION

PATENT NO. : 5,321,698
DATED : June 14, 1994
INVENTOR(S) : Quang H. Nguyen et al.

It is certified that error appears in the above-indentified patent and that said Letters Patent is hereby corrected as shown below:

Column 24, line 5, "and" should be --an--.

Column 26, lines 61 & 62, delete "by the instruction decoder stage and to operands fetched".

Signed and Sealed this

Sixth Day of August, 1996

Attest:

BRUCE LEHMAN

Attesting Officer  Commissioner of Patents and Trademarks